Sept. 8, 1964     B. M. AUSTIN     3,147,841
FEEDER CONTROL MECHANISM
Filed April 5, 1960
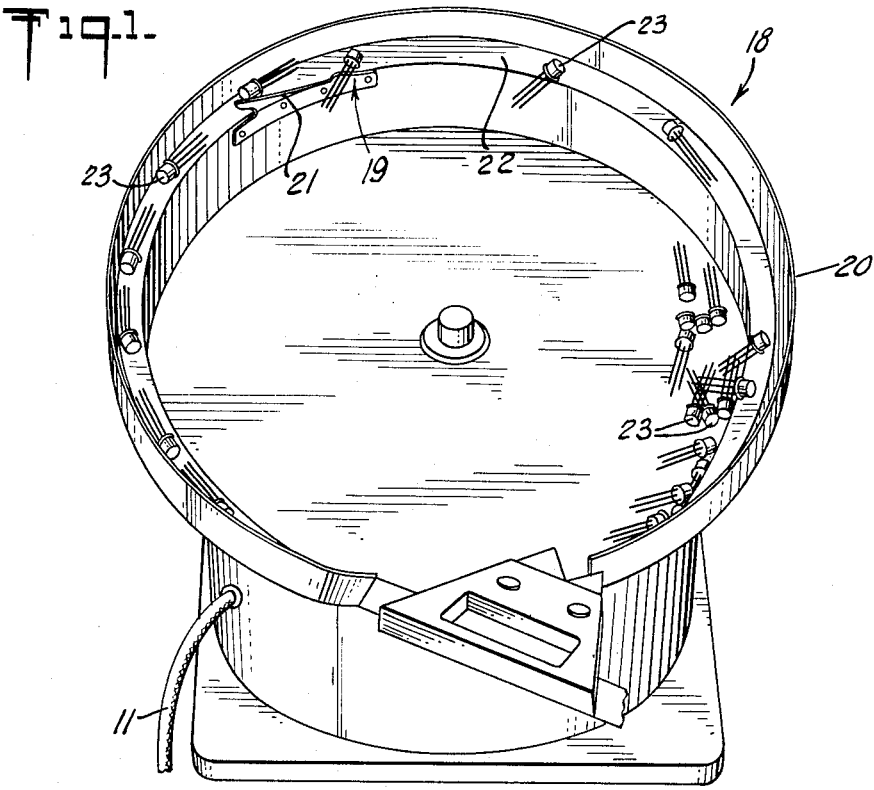
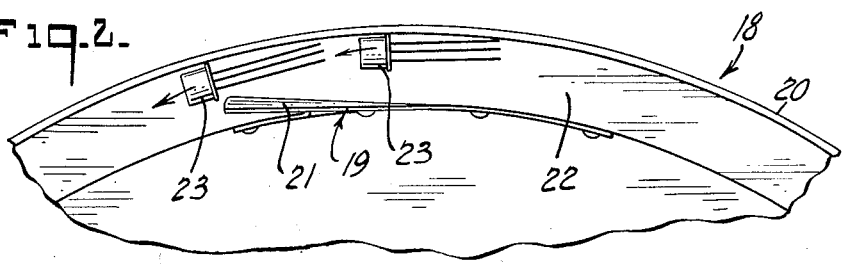
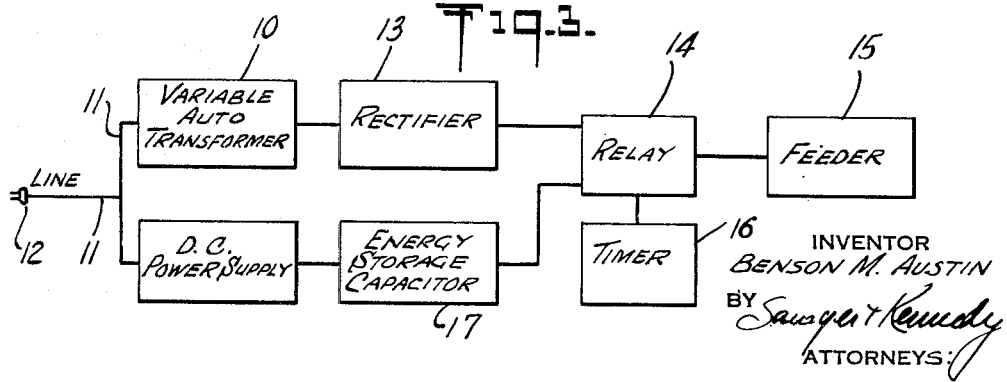
INVENTOR
BENSON M. AUSTIN
BY Sawyer & Kennedy
ATTORNEYS

United States Patent Office 3,147,841
Patented Sept. 8, 1964

3,147,841
FEEDER CONTROL MECHANISM
Benson M. Austin, Lebanon, N.J., assignor to Affiliated Manufacturers, Incorporated, Oldwick, N.J., a corporation of New Jersey
Filed Apr. 5, 1960, Ser. No. 20,083
5 Claims. (Cl. 198—33)

This invention relates to feeder mechanisms and is more particularly concerned with a feeder control mechanism which facilitates the feeding of pieces or parts to a subsequent operation.

In the feeding mechanisms now being used, difficulties have been encountered in obtaining continuous, uninterrupted movement of parts. Interruptions may be caused by inertia, surface tension, static, parts with peculiar geometrics, intertwining with one another, and jamming within the feeder mechanism itself. As a consequence of such jams of the parts or pieces being fed in the mechanism, such parts or pieces are liable to be fed through in large uncontrolled flow of pieces and parts. In some cases, in the conventional feeding mechanisms, dust particles, moisture, static electricity, dirt, etc. cause tieups in the feeding of the parts, especially small parts, since dust particles, moisture, dirt, static electricity may cause the pieces or parts to adhere to one another or to the feeding mechanism. To overcome this problem, some of the feeding mechanisms are built to vibrate but vibration has not solved the problem in the cases of minute parts or oddly shaped parts to be passed through the feeders.

An object of this invention is to provide a means to continuously and automatically break up jams of parts or pieces in the feeding mechanism caused by the interlocking of the pieces or parts, or caused by the presence of static electricity, dirt, moisture or other elements causing surface tension between the parts and the feeder, and those caused by jamming of parts in the feeder mechanism itself.

A further object of this invention is to provide a time or signalled interval dispensing of a predetermined number or quantity of parts or pieces from a collection area or a magazine.

An additional object of this invention is to provide a means to more evenly distribute pieces and parts throughout the feeding mechanism and to assure more positive and easier movement.

A still further object of this invention is to facilitate or initiate the orientation of pieces or parts passing through the feeder mechanism to a predetermined position or level, and the rejection from the feeder mechanism, if not oriented, positioned or levelled as desired.

A further object of this invention is to create a secondary movement to a vibratory feeder from one setting to another setting which movement has the effect of changing electrical amplitude for a repeated controlled period of time. This changed amplitude over the regular amplitude on which the feeder may be working might last for comparatively short periods of time in relation to the regular amplitude, but would allow for movement of pieces or parts while the altered amplitude is in effect rather than from a sudden jar which would not induce continuous movement of the parts or pieces through the mechanism.

For a better understanding of this invention, reference is made to the drawings in which:

FIGURE 1 is a perspective view of the bowl of a feeder mechanism;

FIGURE 2 is a plan view of a detail; and

FIGURE 3 is a block diagram illustrating the control means employed.

In the form as shown, where the device of this invention is employed with a small vibratory feeder mechanism of the bowl type, such feeder mechanisms are quite generally actuated electromagnetically. The device of this invention, when employed in this manner, utilizes the sudden release of electrical energy stored in a capacitor to cause a heavy transient current to flow into the feeder's actuating coil, thus subjecting the entire feeder mechanism to an abrupt mechanical shock. The device of this invention has two controls, one which regulates the time interval between the shocks and the second which regulates the power of the shock.

One form of this mechanism is shown in FIGURE 3, in which the assembly of the device of this invention employed in conjunction with a feeder comprises a power control 10 which is generally a variable auto transformer or a rheostat by which the operator may vary the amount of electrical power employed to actuate the feeder mechanism. The power control 10 regulates the speed of the feeding of the parts into the mechanism and the movement and discharge of the parts being fed. The power control is connected to a conventional leadin wire 11, and a plug 12 for use on a standard wall outlet.

A rectifier 13 connected to the power control 10 and a relay 14 supplies the current to the feeder mechanism 15. The relay 14 is also connected to a timer 16, which regulates the time interval between each release of electrical energy to produce the shock to the feeder. The timer which is of the conventional type may be actuated either electrically or mechanically, and is regulated by a standard control knob by which the operator can select and adjust the time interval between the mechanical shocks to the feeder. The thyratron-relay 14 releases the stored energy from the capacitor 17 to be passed through the relay to the feeder 15. The capacitor 17 which is on a separate electrical source line connected to the leadin wire 11 and plug 12 stores up electrical energy for release through the relay for eventual release to the feeder. During the movement of operation of the timer, the relay disconnects the standard amplitude which provides energy to the feeder for the vibrations from the feeder, and connects the capacitor to the feeder momentarily to deliver to the feeder the electrical energy stored in the capacitor. As soon as the energy in the capacitor has been delivered to the feeder, the timer is recycled automatically and the relay reconnects the feeder to the standard amplitude controller to continue the delivery of the energy for the vibrations of the feeder during the interval between the shocks.

A similar result can be obtained where, instead of delivering a mechanical jolt to the feeder mechanism which is vibrating, the timer control mechanism will cut off at stated intervals the electrical energy causing the vibration. The sudden cut off of the energy causing the vibrations serves to jolt the feeding mechanism and the parts being fed therein, which aids in the breaking up of jams and the movement of the parts in the feeder.

While the above is a preferred form of the device of this invention used in connecting with a feeder for the feeding of parts, it is possible to use the same mechanism for the feeding of parts having odd shapes or protruding wires, which cause difficulties, not only because of the pile-up of the parts to be moved, but also due to the shapes of the parts, the parts may become interlocked or hooked together. Thus in transistor heads which have lead-in wires extending from the heads, the lead wires have a tendency to interlock or become entangled when passing through the feeder.

To overcome this problem, which generally occurs in the tracks of the feeding bowl 18, orienting vanes 19 are installed on the sides of the tracks 20 in the feeding bowl to orient headers 23 passing through the mechanism along the track wall, and to break up bunches of headers which may have become entwined or tangled in their movement around the feeder bowl. FIGURE 2 illustrates the use of the orienting vanes 19 in a feeder mechanism having a bowl type of feed, but it should be understood that similar types of vanes could be employed with advantage in the tracks of horizontal straight line feeders, or other feeders using tracks to carry the parts.

It was found that in the feeding of headers with trailing wires the steady vibrations alone used in feeder mechanisms generally caused more entanglements or jams at the lead points of the orienting vanes, thus interrupting the feeding movement. When the mechanical jolt caused by the method of this invention was introduced, the jams were lessened and when jams did occur, the combined action of the mechanical jolts and the vanes caused the entangled parts or wires to be jostled apart and thus break up the jams. Furthermore, the combined action of the jolt and the orienting vanes served to force the headers and their protruding trailing wires to flow in the same direction with the headers first and the trailing wires behind.

Where the wires protruding from the header have become bent or twisted, jams of the feeding are likely, and the transistor headers having the entangled wires should be rejected to avoid such jams. The combination of the mechanical jolt and the orienting vanes has eliminated this problem by causing the jammed parts to be rejected and thrown off the feeding track, since the trailing wires of the jammed transistor headers will not enter escapement spaces and will thus be thrown from the mechanism while the oriented headers having their protruding wires between the sides of the escapement tracks will continue on in the feeding mechanism.

The device of this invention has been found helpful in the feeding of many types of miniature parts such as germanium and silicon wafers, indium spheres and pellets, washers, small metal parts, transistor headers and the like, which previously had a tendency to jam or stick together while passing through a feeder mechanism.

The device of this mechanism is flexible in its use and may be a supplement to a controller unit on vibratory feeders or it may be incorporated into the unit itself with a separate controller. The same type of device could be employed in a feeder operation where parts may be introduced in bunches from a hopper to cause uniform and slow dispensing of individual parts, since the jolt caused at specified intervals would cause the part to be moved only at a predetermined rate.

The description of the device for introducing the mechanical jolt to a feeder mechanism has been for illustration only, and it will be obvious that the same jarring or jolting action might be produced by other means, and for other purposes other than those described above. The concept of this invention is not to be limited by the illustrations described herein.

I claim:
1. An article feeding and orienting device comprising:
   a bowl having an inclined track about its inner periphery and adapted to contain a plurality of articles;
   electromechanical drive means for vibrating said bowl at a predetermined amplitude and moving the articles within said bowl onto said track;
   orienting means located along said track to properly orient the articles being fed along said track; and
   cyclically operable electrical discharge means for superimposing a jolt of a higher amplitude than said bowl vibration amplitude upon said bowl to thereby unjam any article jam-up which may have occurred along said track.
2. A mechanism as defined in claim 1 wherein the amplitude of said electrical discharge means is adjustable.
3. A mechanism as defined in claim 1 wherein the time interval between discharges of said electrical discharge means is adjustable.
4. A method of feeding articles comprising:
   locating a plurality of articles within a container having a feed track;
   vibrating said container at a predetermined amplitude to move the articles within said container onto said feed track;
   orienting said articles as they feed along said feed track; and
   superimposing a high-amplitude charge of electrical energy onto said vibrating container to disentangle any articles which have become entangled while feeding along said feed path.
5. The method defined in claim 4 wherein high-amplitude charge of electrical energy is of a greater amplitude than said predetermined container vibration amplitude.

References Cited in the file of this patent
UNITED STATES PATENTS

| | | |
|---|---|---|
| 2,725,971 | Clark | Dec. 6, 1955 |
| 2,798,643 | Arnett | July 9, 1957 |
| 2,858,008 | Dilts | Oct. 28, 1958 |

OTHER REFERENCES

AMI Product Digest, Micro Feeder Model EBR–00(a) by Affiliated Manufacturers, Incorporated, P.O. Box 211, Oldwick, New Jersey, published Oct. 15, 1958.